(12) United States Patent
Maejima

(10) Patent No.: US 7,117,850 B2
(45) Date of Patent: Oct. 10, 2006

(54) OUTBOARD MOTOR

(75) Inventor: Hiroyuki Maejima, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 10/720,126

(22) Filed: Nov. 25, 2003

(65) Prior Publication Data

US 2004/0103884 A1    Jun. 3, 2004

(30) Foreign Application Priority Data

Nov. 26, 2002    (JP) .............................. 2002-342619

(51) Int. Cl.
*F00M 55/02*    (2006.01)
*F02M 55/01*    (2006.01)

(52) U.S. Cl. .................................................. 123/468

(58) Field of Classification Search ............... 123/468, 123/470, 184.38, 472
See application file for complete search history.

(56) References Cited

U.S. PATENT DOCUMENTS

| | | | | |
|---|---|---|---|---|
| 5,899,778 | A * | 5/1999 | Hiraoka et al. | 440/88 R |
| 6,321,720 | B1 * | 11/2001 | Kashima | 123/470 |
| 6,446,594 | B1 * | 9/2002 | Watanabe et al. | 123/198 E |
| 6,450,847 | B1 * | 9/2002 | Kashima et al. | 440/88 R |
| 6,471,559 | B1 * | 10/2002 | Kashima | 440/88 R |
| 6,481,411 | B1 * | 11/2002 | Katayama | 123/339.23 |
| 6,645,021 | B1 * | 11/2003 | Kawai et al. | 440/76 |

* cited by examiner

*Primary Examiner*—John T. Kwon
(74) *Attorney, Agent, or Firm*—Oblon, Spivak, McClelland, Maier & Neustadt, P.C.

(57) ABSTRACT

An outboard motor comprises an engine disposed inside an outer cover, an intake unit provided for the engine and including a throttle body disposed in a vicinity of a crankcase of the engine and an intake manifold disposed on a side of the engine so as to extend from the throttle body, the intake manifold having a plurality of intake pipes extending towards intake ports formed in a cylinder head of the engine, and a fuel injectors disposed in substantially intermediate portions of the respective intake pipes.

4 Claims, 4 Drawing Sheets

OUTBOARD MOTOR

BACKGROUND OF THE INVENTION

1. Field of the Invention

The present invention relates an outboard motor especially having an improved structure of an intake system and a fuel supply system for the outboard motor.

2. Description of the Related Art

A certain type of an engine, i.e., internal combustion engine, utilizes a carburetor as a device for supplying a fuel-air mixture into the internal combustion engine. The carburetor is designed to achieve the maximum performance through a combination of several jets in order to meet the requirements in performance and operation of the engine. Such a carburetor is therefore inappropriate for adaptation to variation of driving conditions of the engine and surroundings, according to circumstances.

Therefore, there have recently been widely used internal combustion engines provided with a fuel injection device in place of the carburetor. The fuel injection device directly injects fuel through a fuel injector into an intake passage of the engine in an amount. This amount is judged as the most appropriate amount required currently, based on a correction value therefor, which is determined by obtaining internal and external information on the engine with the use of various sensors, and then processing the thus obtained information by a computer. Such a fuel injection device can contribute an improvement of a combustion efficiency and capacity of the engine and can achieve a reduced fuel-consumption due to the injection of the fuel in the minimum amount as required, thus providing many advantageous effects.

With respect to an example of arrangement of the fuel injectors in the engine for an outboard motor, which is provided with the fuel injection device, Japanese Laid-Open Patent Application No. HEI 8-310487 discloses the fuel injectors, which are mounted on a connection of an intake manifold to a cylinder head of the engine so as to inject fuel to an intake port formed in the cylinder head.

The engine for an outboard motor is surrounded with a cowl, and an intake operation is carried out within the cowl so as not to suck water during the intake operation.

According to the above-described setting position of the fuel injectors and the injection direction of fuel, there is a short distance between the fuel injector and the combustion chamber formed in the cylinder head, and it takes merely a short period of time for the injected fuel to reach the combustion chamber, with the result that the fuel is sucked into the combustion chambers in a completely atomized state (i.e., a fully mixed state).

As a result, a HC (hydrocarbon) content in an exhaust gas increases, and the fuel, which has still been kept in a liquid state, passes through a gap around a piston ring to enter a crankcase, thus leading to declination in concentration of engine oil and being inconvenient or disadvantageous.

Especially, the internal combustion engine for an outboard motor has a cooling system in which cooling water is taken from the outside the engine to cool the same, thus leading to a relatively low temperature of the cooling water. In addition, a low speed driving operation such as a trawling operation or an idling operation of the engine is carried out with high frequency, thus leading to a relatively low temperature of the engine itself. These characteristics of the internal combustion engine for an outboard motor cause an easy occurrence of the inconveniences or disadvantages mentioned above.

On the other hand, the temperature of air existing in the cowl, with which the internal combustion engine is surrounded, increases by heat of the engine, and the thus heated air is taken into the engine. In these circumstances, increase in temperature of the air may lead to reduction of intake efficiency and deterioration of engine capacity.

SUMMARY OF THE INVENTION

An object of the present invention, which was conceived to overcome the inconveniences or disadvantages encountered in the prior art mentioned above, is therefore to provide an outboard motor, which permits improvement in fuel atomization.

Another object of the present invention is to provide an outboard motor, which permits decrease in temperature of sucked air.

These and other objects can be achieved according to the present invention by providing an outboard motor comprising:

an outer cover;

an engine disposed inside the outer cover and comprising a crankcase, a cylinder block and a cylinder head, which are operatively connected to each other in a horizontal direction in the outer cover;

an intake unit provided for the engine and including a throttle body disposed in a vicinity of the crankcase, and an intake manifold disposed on a side of the engine so as to extend from the throttle body, the intake manifold having a plurality of intake pipes extending towards intake ports formed in the cylinder head to be connected thereto; and a fuel injector unit disposed in substantially an intermediate portion of the intake manifold.

In a preferred embodiment, the following structures or structural features may be adopted.

The fuel injector unit is placed in a space between a side wall of the engine and the intake manifold.

The outboard motor may further comprise an intake duct connected to an upstream side of an intake passage, the intake duct being disposed on a downstream side of the fuel injector unit, which is placed in a space formed between a side wall section of the engine and the intake manifold, and the intake duct is provided with an air inlet, which is placed above a lowermost intake pipe of the intake manifold.

The air inlet of the intake duct is positioned at a lower end thereof so as to open downward. The intake passage is formed so as to communicate with an outside air intake port formed to the outboard motor outer cover.

The outboard motor may further comprise a fuel supply unit disposed on a downstream side of the fuel injector unit in a space formed between a side wall of the engine and the intake manifold.

The fuel injector unit includes a plurality of fuel injectors provided for the intake pipes, respectively, at portions between the throttle body and the cylinder head and the fuel injectors are coupled together by means of delivery pipe. The intake manifold has a shape curved along an inner surface of the outer cover of the outboard motor.

According to the characteristic structures of the preferred embodiment of the present invention mentioned above, the fuel injectors are arranged in the space formed between the wall section of the cylinder block and the intake manifold having the curved shape, so that it makes possible to avoid an unnecessary increase in width of the engine, thus downsizing the engine.

In addition, by placing the intake duct, which is connected to the upstream side of the intake passage, on the downstream side of the fuel injectors and by locating the air inlet of the intake duct above the lowermost intake pipe, it becomes possible for the intake manifold 31 to reduce the atmospheric temperature around the intake duct 35. As a result, an intake temperature can be decreased, thus improving the intake charge efficiency and increasing the engine capacity.

Furthermore, placing the fuel supply unit on the downstream side of the fuel injectors in the space facilitates the pipe connection for the components of the fuel supply unit and provides a downsized structure. It is also possible to previously assemble the components of the fuel supply unit with the intake manifold into an assembled unit, thus improving assembling and servicing properties.

Still furthermore, according to the outboard motor described above, the fuel can be sufficiently atomized and sucked into the combustion chamber of the engine, thus eliminating defect on this operation, and the fuel injectors can be protected even if the outboard motor is inverted in the course of conveyance, for example.

In addition, the improvement of the intake efficiency will lead to the increasing of the engine power. Water cannot be sucked together with air from the intake duct. The pipe connection of the components of the fuel supply unit can be facilitated and the assembling and servicing properties can also be improved.

The nature and further characteristics features will be made more clear from the following descriptions made with reference to the accompanying drawings.

DESCRIPTION OF THE PREFERRED EMBODIMENTS

A preferred embodiment of an outboard motor of the present invention will be described hereunder in detail with reference to the accompanying drawings. Further, it is to be noted that terms "left", "right", "upper", "lower" and the like are used herein with reference to the illustration of the drawings or in a practically usable state.

Figure 1:
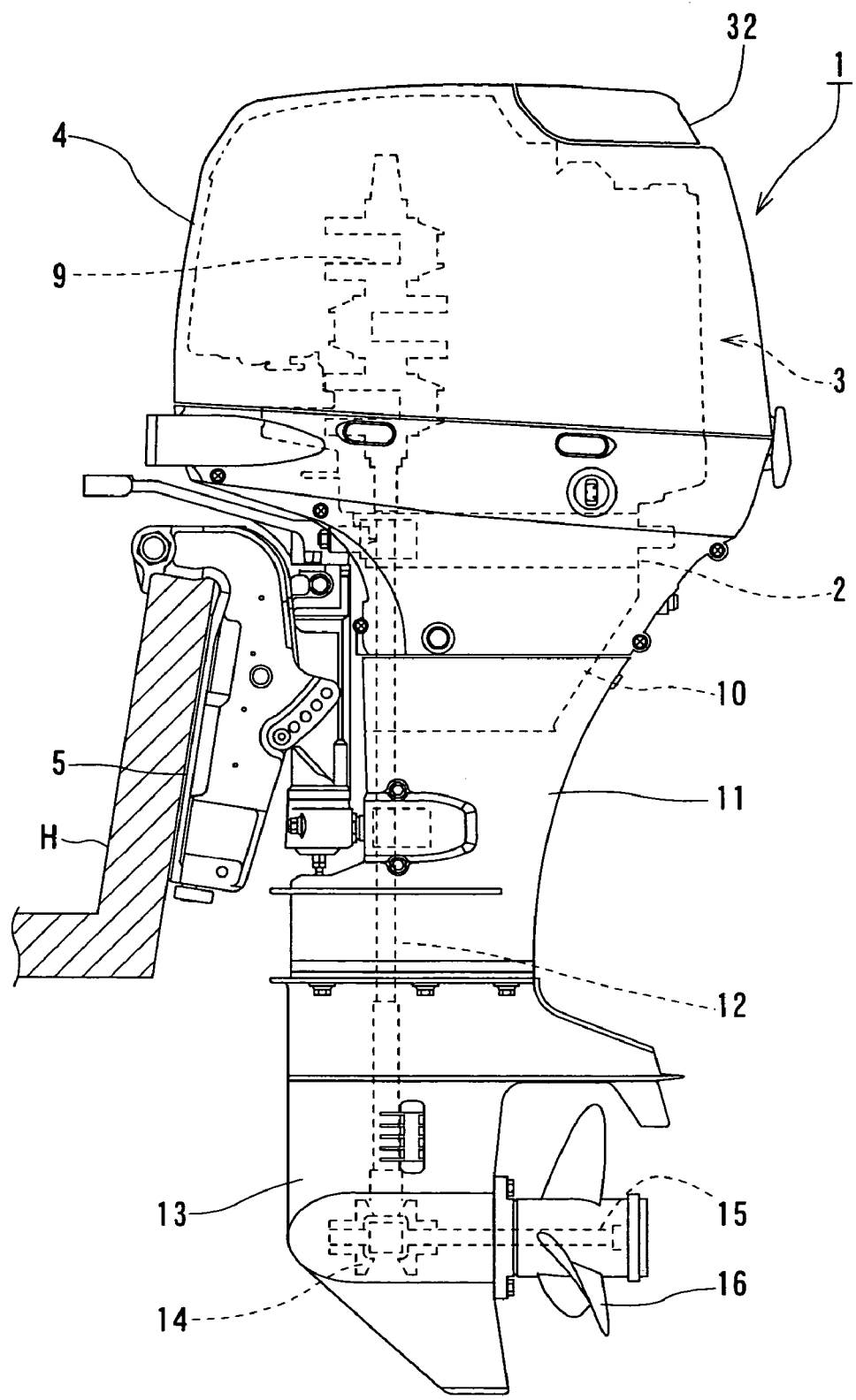
FIG. 1 is a left-hand side view illustrating an outboard motor of one embodiment of the present invention.

Referring to FIG. 1, the outboard motor 1 includes an engine holder 2. An engine, i.e., internal combustion engine, 3 is mounted above the engine holder 2. The engine 3 is surrounded with a cowl, i.e., outer cover, 4. In addition, a bracket 5 is connected to the engine holder 2. The outboard motor 1 can be mounted on a transom of a hull H through the bracket 5.

Figure 2:
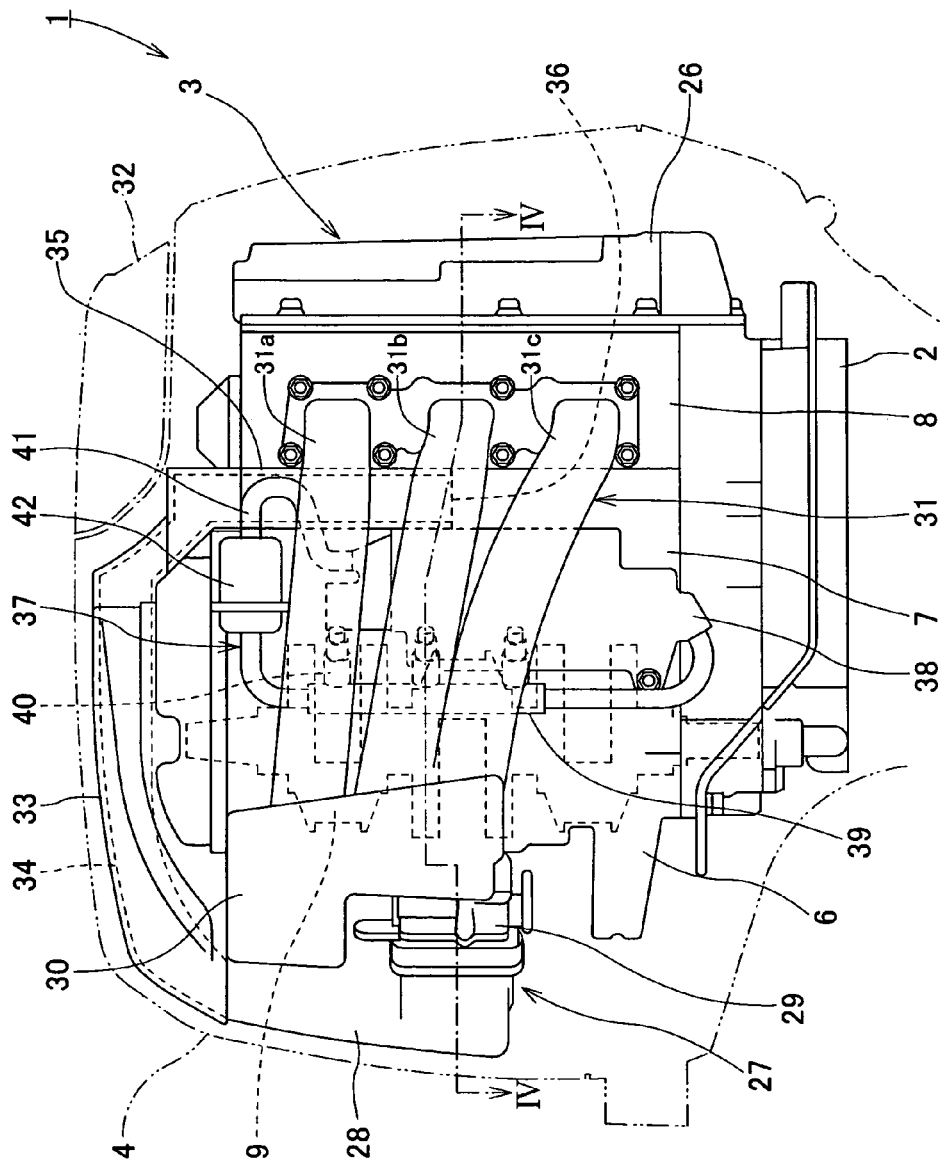
FIG. 2 is an enlarged side view illustrating an internal combustion engine of the outboard motor of the present invention.
Figure 3:
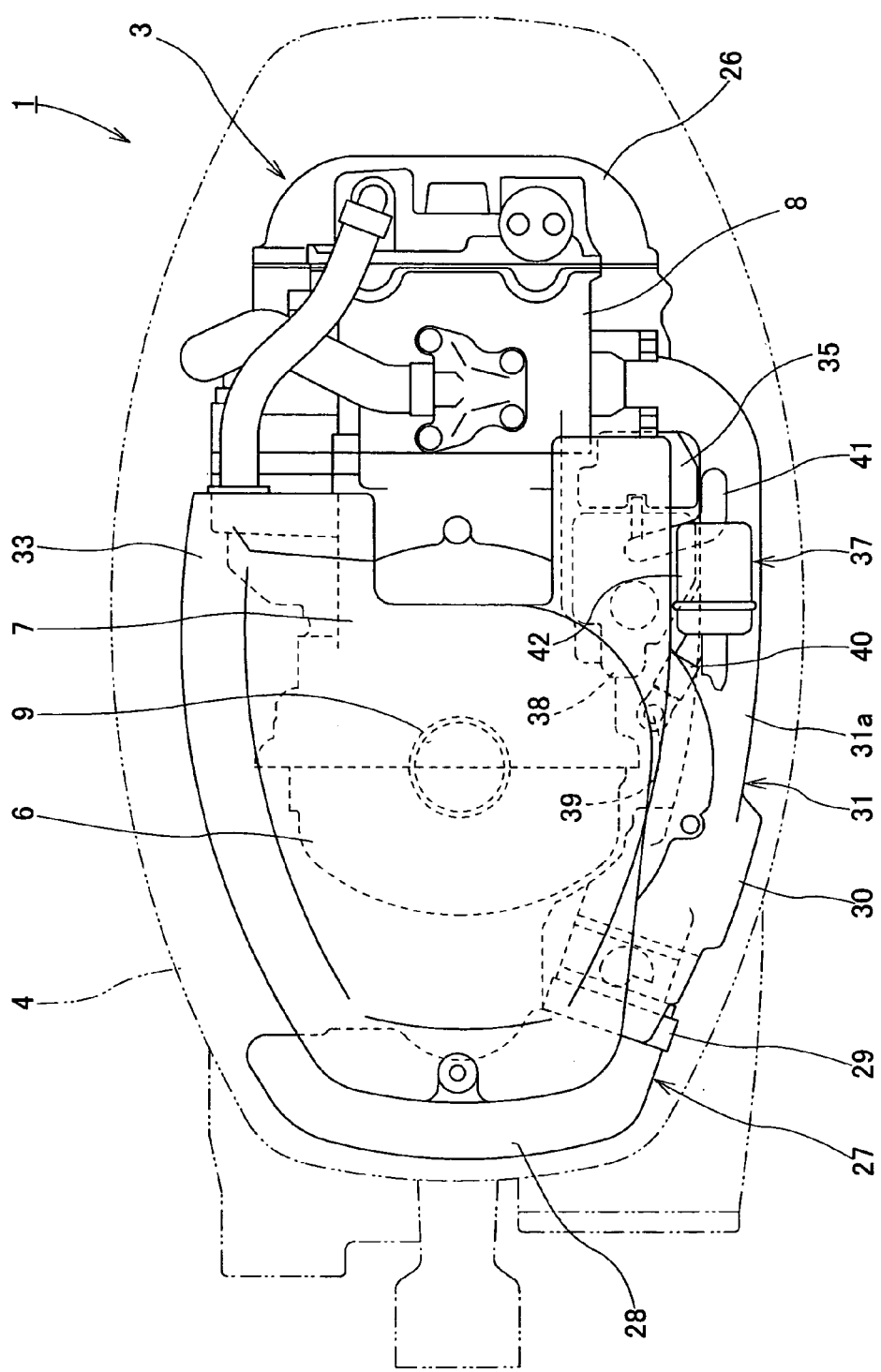
FIG. 3 is a plan view of the internal combustion engine as shown in FIG. 2.
Figure 4:
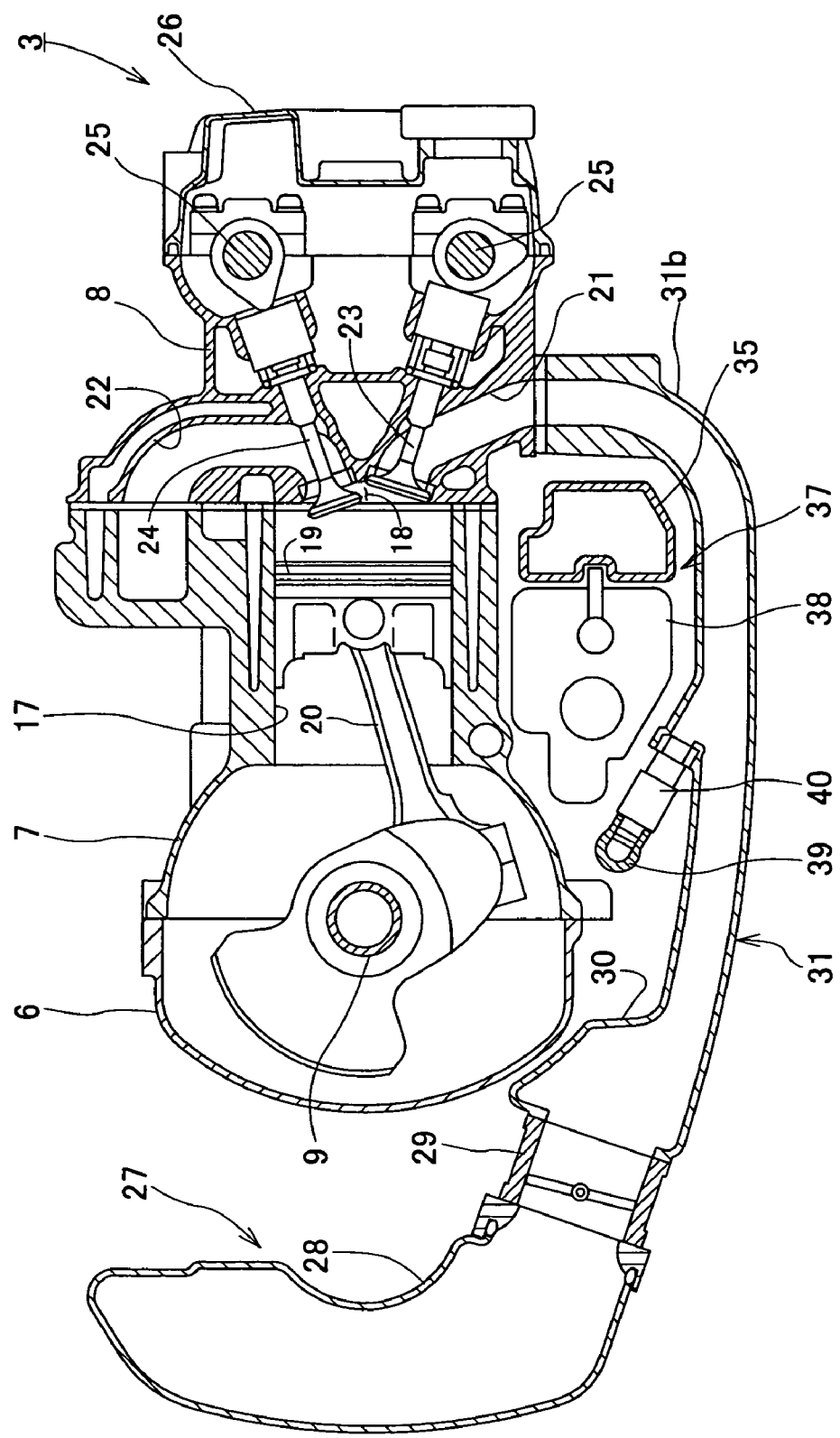
FIG. 4 is a sectional view cut along the line IV—IV shown in FIG. 2.

Next, with reference to FIGS. 2 to 4, in which the cowl 4 is shown in phantom lines in order to show a state in which the cowl 4 is removed from the outboard motor.

As shown in FIGS. 2 to 4, the engine 3 mounted in the outboard motor 1 is, for example, a water-cooled four-stroke-cycle three-cylinder engine in which a crankcase 6, a cylinder block 7 and a cylinder head 8 are operatively connected to each other in the horizontal direction in this order from the front side (left side as viewed in, for example, FIG. 2) of the outboard motor.

The crankcase 6 is disposed on the forefront side of the engine 3, i.e., the left-hand side, the cylinder block 7 is disposed behind the crankcase 6, and the cylinder head 8 is disposed behind, i.e., the right-hand side in FIGS. 2 to 4, the cylinder block 7.

A crankshaft 9 is disposed substantially vertically in a connection portion of the crankcase 6 and the cylinder block 7. An oil pan 10 is disposed below the engine holder 2 and a drive shaft housing 11 is placed below the oil pan 10, as shown in FIG. 1. The lower end of the crankshaft 9 is connected to the upper end of a drive shaft through, for example, a spline connection. The drive shaft extends downward in the drive shaft housing 11 so as to drive a propeller 16 through a bevel gear 14 and a propeller shaft 15, which are placed in a gear case 13 provided below the drive shaft housing 11.

The cylinder head 8 of the engine 3 is provided with combustion chambers formed therein, which are aligned with cylinder bores 17 that are formed horizontally in the cylinder block 7. Pistons 19 are inserted into the respective cylinder bores 17 so as to be slidable in the horizontal direction. The pistons 19 are connected to the crankshaft 9 by means of a connection rod 20 so that a reciprocating motion of the pistons 19 is converted into a rotational motion of the crankshaft 9.

The cylinder head 8 is provided with an intake port 21 and an exhaust port 22 formed therein for each of the combustion chambers 18. The intake port 21 and the exhaust port 22 communicate with the combustion chamber 18. An intake valve 23 and an exhaust valve 24, for each of the combustion chambers 18, are placed in the cylinder head 8 so as to open or close the intake port 21 and the exhaust port 22. In addition, a camshaft 25, which constitutes a part of a valve drive unit or mechanism of the engine 3, for opening or closing the valves 23, 24, is also placed in the rear side of the cylinder head 8. The rear side of the cylinder head 8 is surrounded with a cylinder head cover 26.

The engine 3 is provided with an intake unit 27. The intake unit 27 is composed mainly of a silencer 28, a throttle body 29, a surge tank 30 and an intake manifold 31. The intake unit 27 is disposed on one side of the engine, i.e., in an area extending from the front side of the engine 3 to the left-hand side thereof in the illustrated embodiment of the present invention.

The throttle body 29 is disposed in the vicinity of the crankcase 6 of the engine 3, for example, in the left-hand and forward position. The surge tank 30 is disposed, side by side with the throttle body 29, in the left-hand and forward position of the crankcase 6 on the downstream (i.e., rear) side of the throttle body 29. A plurality of intake pipes 31a, 31b, 31c, which constitute a part of the intake manifold 31, extend rearward from the surge tank 30 towards the respective cylinders to be connected to the respective intake ports 21. The intake manifold 31 (including the intake pipes 31a, 31b, 31c) curves along the inner surface of the cowl 4.

The silencer 28, which is designed to reduce intake noise, has a shape that can be received in a space between the front side of the engine 3 and the cowl 4. The silencer 28 is connected to the upstream (i.e., forward) end of the throttle body 29.

The cowl 4 is provided on its rear and upper side with an air inlet 32 formed therein, through which air is to be taken into the cowl 4. A flywheel cover 33 with which a flywheel magneto device, not shown, which is connected to the upper end of the crankshaft 9 is surrounded, is disposed above the engine 3. The flywheel cover 33 is provided with an intake passage 34 formed therein. An intake duct 35 is connected to the upstream end of the intake passage 34. The downstream end of the intake passage 34 is connected to the upstream end of the silencer 28. The intake duct 35 extends downward in a space formed between the left-hand wall of the cylinder block 7 and the intake manifold 31 having the curved shape. The intake duct 35 has an air inlet 36, which is formed at the lower end thereof so as to open downwardly. The above-mentioned air inlet 36 is located above the lowermost intake pipe 31c.

In addition, the engine 3 is provided with a fuel supply unit 37. The fuel supply unit 37 is composed of a fuel pump, a fuel filter, a vapor separator 38, a delivery pipe 39 and a fuel injector 40. Some of these components are placed on one side of the engine 3, i.e., the left-hand side of the engine 3 in the embodiment of the present invention. The above-mentioned components are connected to each other through fuel hoses.

The outboard motor 1 of the embodiment of the present invention is provided with a fuel tank, not shown, which is mounted on the hull H of a boat. A fuel supply hose extending from the fuel tank is connected to a low-pressure fuel filter, not shown. In an example case, a low-pressure fuel pump, also not shown, which is driven by the camshaft 25, is disposed in the cylinder head cover 26 with which the rear side of the cylinder head 8 is surrounded. The low-pressure fuel pump and the low-pressure fuel filter are connected to each other through a fuel hose.

The vapor separator 38 is disposed on the front side of the intake duct 35 in the space formed between the left-hand side wall section of the cylinder block 7 and the intake manifold 31 having the curved shape. The vapor separator 38 is designed so as to separate fuel vapor from a liquid fuel such as gasoline to release only the vapor into the atmosphere or return it to the intake unit 27. The fuel is introduced from the low-pressure fuel pump through a low-pressure fuel hose to the vapor separator 38.

The vapor separator 38 is provided therein with a high-pressure fuel pump, not shown. The high-pressure fuel pump supplies the fuel, from which the vapor has been separated, to a high-pressure fuel filter 42, which is placed for example above the vapor separator 38, through high-pressure fuel hoses 41 under a predetermined pressure.

The fuel injectors 40 are disposed in the space formed between the left-hand side wall section of the cylinder block 7 and the intake manifold 31 having the curved shape. The fuel injector 40 is provided in each of the intake pipes 31a, 31b, 31c so as to be directed to the predetermined direction, thus causing an injected fuel to flow smoothly together with the air in the intake manifold 31.

The fuel injectors 40 are placed in an intermediate portion of the respective intake pipes 31a, 31b, 31c, and in a position close to the crank shaft 9 in a region between the crankshaft 9 and the fitting surface of the cylinder block 7 to the cylinder head 8. The fuel injectors 40 are connected to each other through the delivery pipe 39, which is disposed vertically on the front side of the fuel injectors 40.

A high-pressure fuel supplied to the above-mentioned high pressure fuel filter 42 under the predetermined pressure is supplied to the delivery pipes 39 through the high-pressure fuel hoses 41. Then, the fuel injectors 40 inject the high-pressure fuel into the respective intake pipes 31a, 31b, 31c.

Now, operations and/or functions of the characters and structures of the embodiment of the present invention will be described hereunder.

The fuel injectors 40 is disposed at the intermediate portion of the intake pipes 31a, 31b, 31c, which constitute the part of the intake manifold 31, which extends from the surge tank 30 provided on the downstream side of the throttle body 29 to the respective cylinders to be connected to the intake ports 21 formed in the cylinder head 8, and preferably in a position close to the crank shaft 9 in a region between the crankshaft 9 and the fitting surface of the cylinder block 7 to the cylinder head 8. It is therefore possible to ensure a long distance between the fuel injectors 40 and the combustion chambers 18. Accordingly, a period of time required for the injected fuel to reach the combustion chambers 18 is extended. As a result, the fuel is sucked into the combustion chambers 18 in a completely atomized state (i.e., a fully mixed state with air).

Consequently, there can be avoided the problem that a HC (hydrocarbon) content in an exhaust gas increases, and the fuel, which has still been kept in a liquid state, passes through a gap around a piston ring to enter a crankcase, thus leading to declination in concentration of engine oil.

Furthermore, placing the fuel injectors 40 in the space formed between the left-hand wall of the cylinder block 7 and the intake manifold 31 having the curved shape makes it possible to avoid an unnecessary increase in width of the engine 3, thus downsizing the engine 3. Moreover, even when the engine 3 is laid down on the ground during transportation or service of the engine 3, the fuel injectors 40 can be protected by the intake manifold 31.

In addition, placing the intake duct 35, which is connected to the upstream side of the intake passage 34, on the downstream side of the fuel injectors 40 in the space formed between the left-hand wall of the cylinder block 7 and the intake manifold 31 having the curved shape, on the one hand, and locating the air inlet 36 of the intake duct 35 above the lowermost intake pipe 31c, on the other hand, enable the intake manifold 31, which has been cooled by the heat of vaporization of the fuel, to reduce the atmospheric temperature around the intake duct 35. As a result, an intake temperature can be decreased, thus improving the intake charge efficiency and increasing the engine output.

Furthermore, causing the air inlet 36 formed on the lower end of the intake duct 35 to open downwardly makes it possible to prevent such water from being sucked together with air from the intake duct 35 even when water comes into the cowl 4 from the air inlet 32, which is provided on the rear and upper side of the cowl 4, Placing the vapor separator 38 and the high-pressure fuel filter 42, which constitute the fuel supply unit 37, on the downstream side of the fuel injectors 40 in the space formed between the left-hand side wall of the cylinder block 7 and the intake manifold 31 having the curved shape facilitates the pipe connection for the components of the fuel supply unit 37 and provides a downsized structure. It is also possible to previously assemble the components of the fuel supply unit 37 with the intake manifold 31 into an assembled unit, thus improving assembling and servicing properties.

Still furthermore, according to the outboard motor described above, it is possible to cause the fuel to be sucked into the combustion chambers in a completely atomized state, thus eliminating the defects or drawbacks encountered in the prior art. Further, even when the engine is laid down on the ground during transportation or service of the engine, the fuel injectors can be protected by the intake manifold.

In addition, the intake charge efficiency can be improved, thus increasing the engine output. Water cannot be sucked together with air from the intake duct. The pipe connection of the components of the fuel supply unit can be facilitated and the assembling and servicing properties can also be improved.

It is to be noted that the present invention is not limited to the described embodiment and many other changes and modifications may be made without departing from the scopes of the appended claims.

What is claimed is:

1. An outboard motor comprising:
    an engine cover;
    an engine disposed inside the engine cover and comprising a crankcase, a cylinder block and a cylinder head, which are operatively connected to each other in a horizontal direction in the engine cover;
    a throttle body disposed in front of the crankcase;
    an intake manifold extending from the throttle body to an intake port formed on the cylinder head and connected thereto, said intake manifold having a shape curved along an inner surface of the engine cover of the outboard motor and having a plurality of intake pipes in a vertical arrangement on a side of the engine;
    an intake passage connected to the throttle body on an upstream side thereof; and
    an intake duct connected to an upstream side of the intake passage and disposed in a space formed between a side surface of the engine and the intake manifold.

2. An outboard motor according to claim 1, further comprising a fuel injector unit disposed in the space formed between the side surface of the engine and the intake manifold nearer a side of the crankcase than a side of the intake duct.

3. An outboard motor according to claim 1, wherein the intake duct is provided with an air inlet formed at a lower end side of the intake duct in a vertical arrangement thereof.

4. An outboard motor according to claim 3, wherein the air inlet formed on the intake duct is positioned above a lowermost one of the intake pipes.

* * * * *